United States Patent [19]

Kato et al.

[11] 4,315,318
[45] Feb. 9, 1982

[54] METHOD AND APPARATUS FOR PROCESSING A RADIATION IMAGE

[75] Inventors: Hisatoyo Kato; Masamitsu Ishida; Seiji Matsumoto, all of Minami-ashigara, Japan

[73] Assignee: Fuji Photo Film Co., Ltd., Kanagawa, Japan

[21] Appl. No.: 104,855

[22] Filed: Dec. 18, 1979

[30] Foreign Application Priority Data

Dec. 26, 1978 [JP] Japan ............................. 53-163571
Jul. 11, 1979 [JP] Japan ............................... 54-87800
Nov. 22, 1979 [JP] Japan .............................. 54-151398
Nov. 22, 1979 [JP] Japan .............................. 54-151400
Nov. 22, 1979 [JP] Japan .............................. 54-151402

[51] Int. Cl.$^3$ ............................................. H04N 1/40
[52] U.S. Cl. ................................ 364/515; 250/337; 358/284; 364/414
[58] Field of Search ............... 364/414, 415, 515, 518; 250/330, 337, 445 T, 445 R, 362, 363 R; 358/96, 111, 166, 280, 284

[56] References Cited

U.S. PATENT DOCUMENTS 3,006,238 10/1961 Eberline ............................. 358/96
3,696,249 10/1972 Bowker .............................. 358/96
3,859,527 1/1975 Luckey .............................. 250/337
3,927,323 12/1975 Koloc ................................ 250/330
3,936,598 2/1976 Newitt .............................. 358/96
3,975,637 8/1976 Ikedo et al. ....................... 250/337
4,196,453 4/1980 Warren ............................. 364/515

Primary Examiner—Errol A. Krass
Attorney, Agent, or Firm—Sughrue, Mion, Zinn, Macpeak and Seas

[57] ABSTRACT

A method and apparatus for processing a radiation image in a radiation image recording system in which a stimulable phosphor is stimulated with a scanning stimulating beam and the light emitted from the stimulable phosphor upon stimulation by the stimulating beam is detected by a detector which generates an output which is processed and used for recording a visible image on a recording material. In the processing of the detected output, an operation represented by a formula $$S' = Sorg + \beta (Sorg - Sus)$$

is conducted, where Sorg is the original image signal detected by the detector, $\beta$ is an emphasis coefficient, and Sus is an unsharp mask signal corresponding to a super-low spatial frequency at every scanning point. The unsharp masking process may be performed together with a gradation process, reduction of image size, smoothing process and the like. Further, the emphasis coefficient may be varied with either the original image signal Sorg or the unsharp mask signal Sus.

16 Claims, 32 Drawing Figures $\beta$ = Const    $\beta' \geqq 0$    $\beta' \leqq 0$    $\beta' \lessgtr 0$

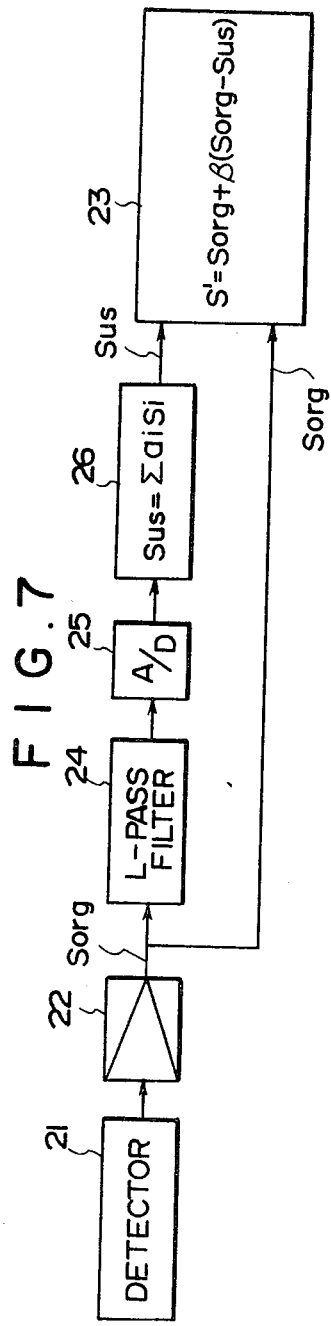
F I G. 7
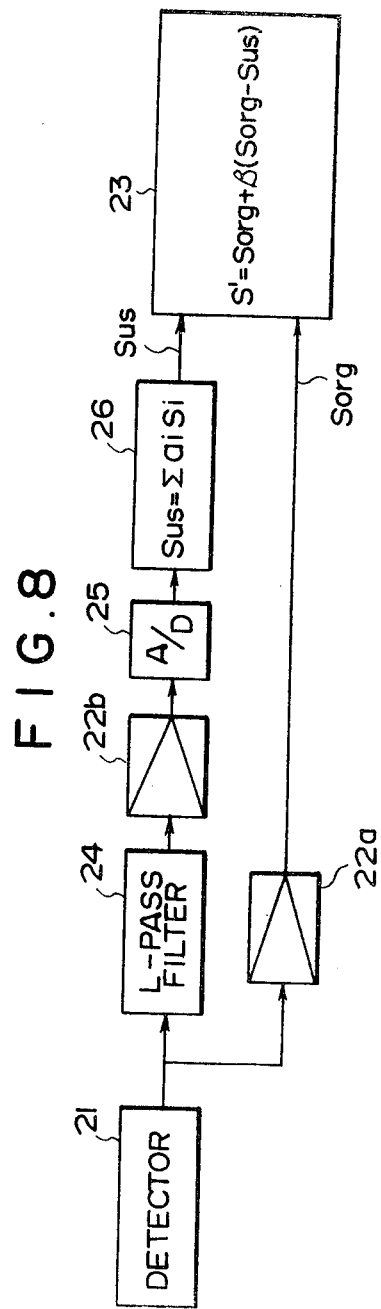
F I G. 8

FIG. 9
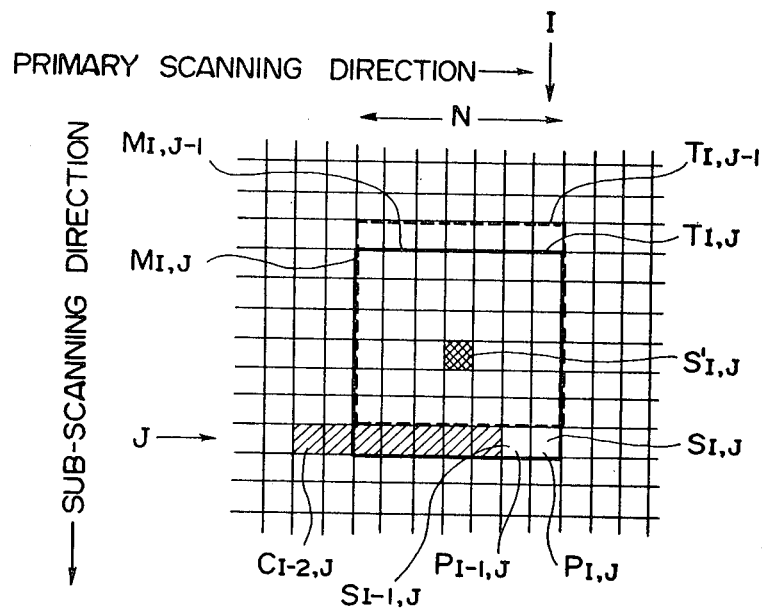
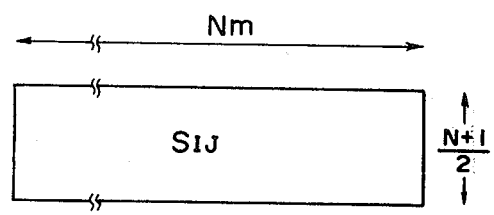
FIG. 10A
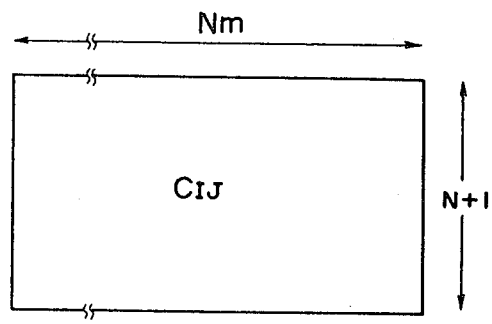
FIG. 10B
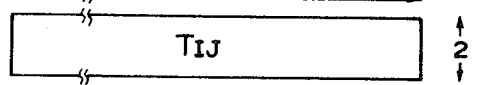
FIG. 10C

METHOD AND APPARATUS FOR PROCESSING A RADIATION IMAGE

BACKGROUND OF THE INVENTION

1. Field of the Invention

This invention relates to a method of processing a radiation image in a radiation image recording system used for medical diagnosis and an apparatus therefor. This invention particularly relates to an image processing method and apparatus in a radiation image recording system in which a stimulable phosphor is used for recording radiation image information as an intermediate recording medium and the image recorded therein is read out for reproduction and finally recorded on a recording medium.

2. Description of the Prior Art

It is known in the art as disclosed in U.S. Pat. No. 3,859,527 to record radiation image information in a stimulable phosphor by exposing the phosphor to radiation transmitted through an object such as a human body, then reading out the recorded information by use of a photodetector by stimulating the phosphor with a scanning laser beam or the like, and record recording the read out information on a recording medium by modulating a recording laser beam or the like with the information read out by the photodetector.

The above-described radiation image recording system is far more advantageous than the conventional radiography system using a silver halide photographic film in that the image is recorded over a very wide range of radiation exposure. Therefore, this system is particularly useful when applied in medical diagnosis in which the human body is recorded in the same manner as in conventional radiography. By using this system for such purposes, it becomes possible to obtain information which cannot be obtained with conventional radiography because of the limited exposure range that can be recorded and observed on the conventional X-ray film.

Further, since the X-rays do harm to the human body, it is impossible from the viewpoint of safety to expose the human body to X-rays of high dose. Therefore, it is desired that the necessary information for radiography be obtained by exposing the human body only once to X-rays of a comparatively low dose. On the other hand, radiographs should preferably have both wide exposure latitude and high image quality including high contrast, high sharpness, low noise etc. for viewing and diagnosis. Unfortunately, since the conventional radiography system is designed so as to satisfy all the required conditions to some extent, the range of recording density or the ability to record various levels of information and the image quality are both insufficient and neither of these properties are completely satisfied.

The radiation image recording system as mentioned hereinbefore disclosed in U.S. Pat. No. 3,859,527 thus does not solve the above problems of conventional radiography.

SUMMARY OF THE INVENTION

The primary object of the present invention is to provide a method and apparatus for processing a radiation image in a radiation image recording system using a stimulable phosphor in which both the attributes of wide exposure latitude and the high image quality are satisfied.

Another object of the present invention is to provide a method and apparatus for processing a radiation image in a radiation image recording system using a stimulable phosphor which is capable of producing a radiation image having high diagnostic efficiency and accuracy.

Still another object of the present invention is to provide a method of and apparatus for processing a radiation image in a radiation image recording system usng a stimulable phosphor which is capable of providing a radiation image having high diagnostic efficiency and accuracy at a high speed and at a low cost.

Other objects of the present invention will be made apparent from the following description of the invention.

The inventors of the present invention have found through research and investigations that the spatial frequency components of the radiation image of a human body which is important for diagnosis are in a region of very low frequencies (which will hereinbelow be referred to as "super-low frequency") though there is some variation in the most important frequency between the portions of the human body to be diagnosed. Further, it has also been discovered that the emphasis of the high frequency components does not improve the diagnostic efficiency and accuracy but emphasizes the noise components and lowers the diagnostic efficiency and accuracy, and on the other hand the reduction of the emphasis of the high frequency components reduces the noise and provides a legible image from a viewpoint of diagnosis. The present invention is based on the above discoveries.

The method of processing a radiation image in accordance with the present invention is characterized in that, in the course of scanning a stimulable phosphor with a stimulating ray, reading out the radiation image information recorded thereon, converting the read out information into an electric signal and recording a visible image on a recording medium using the electric signal, an unsharp mask signal Sus corresponding to the super-low frequency is obtained for each scanning point and a signal conversion represented by a formula $$S' = Sorg + \beta(Sorg - Sus) \quad (1)$$

where Sorg is an original image signal read out from the stimulable phosphor and $\beta$ is an emphasis coefficient is performed to emphasize the frequency components above the super-low frequency.

In the present invention, more than one unsharp mask can be used so long as the signal conversion is performed according to the above formula. For instance, when two unsharp masks of different sizes are used, the formula can be represented as follows.

$$S' = Sorg + \beta(Sorg - Sus1) + \alpha(Sorg - Sus2)$$

This formula, however, can be rewritten into the form of $$S' = Sorg + (\beta + \alpha) \left[ Sorg - \frac{1}{\beta + \alpha}(\beta Sus1 + \alpha Sus2) \right].$$

This rewritten formula means that the above operation using the two unsharp masks can be regarded as equivalent to the aforesaid basic operation using only one unsharp mask. When the size of the unsharp mask Sus2 is smaller than the unsharp mask Sus1 and the emphasis coefficient $\alpha$ is positive, the graph of the modulation transfer function has a shape which has an additional peak in the higher frequency components in the range of emphasized frequency. When the emphasis coefficient $\alpha$ is negative, the graph has a stepped lowered portion in the higher frequency components in the range of emphasized frequency. The former is suitable for recording an image of bones, blood vessels (angiography) and stomach (double contrast), and the latter is suitable for recording an image as a chest tomograph, cholecystograph, or an image of the liver, abdomen or head.

Further, the process in accordance with the present invention includes any process in which the results of the operation of signal conversion are the same as those of the operation with the above-mentioned formula (1), and there is no limit or no restriction with respect to the order of operation.

The unsharp mask signal Sus referred to herein means a signal representing every scanning point which is made by blurring the original image signal so that it contains only frequency components lower than the super-low frequency. In other words, the unsharp mask signal Sus is a signal representing an unsharp image obtained by blurring the original image to such an extent that the unsharp mask signal contains only the super-low frequency. In the unsharp mask corresponding to the unsharp image, the modulation transfer function is not less than 0.5 at a spatial frequency of 0.01 cycle/mm and not more than 0.5 at a spatial frequency of 0.5 cycle/mm. Further, in order to enhance the diagnostic efficiency and accuracy remarkably, it is desired to use an unsharp mask in which the modulation transfer function is not less than 0.5 at a spatial frequency of 0.02 cycle/mm and not more than 0.5 at a spatial frequency of 0.15 cycle/mm.

In other words, the unsharp mask to be used in the present invention can be defined as one in which the spatial frequency fc at which the modulation transfer function becomes 0.5 is within the range of 0.01 to 0.5 cycle/mm, and preferably within the range of 0.02 to 0.15 cycle/mm.

Further, it should be noted that the original signal referred to herein includes a signal which has been processed with a well known signal processing means used in a field of optical instruments, that is, the signal which has been non-linearly amplified by logarithmic amplification or the like for band compression or non-linear compensation. It is often useful to log-compress the signal to compress the band range of the signal when a signal representing intensity of light or the like is processed.

In this invention, the emphasis coefficient $\beta$ may be fixed or changed as a function of the original image signal (Sorg) or the unsharp mask signal (Sus). By changing the emphasis coefficient as a function of the original image signal (Sorg) or the unsharp mask signal (Sus), the diagnostic efficiency and accuracy are further improved.

Further, by selecting the emphasis coefficient $\beta$ and the unsharp mask signal (Sus), the ratio of the maximum value (B) of the modulation transfer function of the system providing the visible image on the final recording medium based on the emphasized signals to the limit value (A) of the modulation transfer function which is a limit value where the spatial frequency is infinitely close to zero, i.e. B/A can be changed. Under the condition of B/A < 1.5, the diagnostic efficiency and accuracy are not much improved as compared with the conventional radiography system. When the emphasis coefficient $\beta$ is fixed, the ratio B/A should not be over 6 since if the ratio is over 6 the image becomes partially unnatural due to over-emphasis and for example, an area whose density is saturated either at white (fog level of the recording medium) or at black (maximum density of the recording medium) appears in the image. On the other hand, when the emphasis coefficient $\beta$ is changed according to the original image signal Sorg or the unsharp mask signal Sus, the desirable range of the ratio B/A is enlarged and may be larger than 6 but not more than 10. In this case, the maximum value of the ratio B/A is regarded as the value B/A since the ratio B/A itself changes as the value Sorg or Sus changes. Thus, it is necessary that the ratio B/A should be 1.5 to 6 when the emphasis coefficient $\beta$ is fixed and 1.5 to 10 when it is changed with Sorg or Sus. Further, it has also been found that the diagnostic efficiency and accuracy are remarkably improved when the ratio B/A is selected within the range of 2 to 5.5 and 2 to 8 in the respective cases.

The emphasis coefficient $\beta$ is selected so that the ratio B/A is within the desirable range. The ratio B/A, however, somewhat changes also with the shape of the unsharp mask or the unsharp mask signal Sus. Therefore, the value of $\beta$ cannot be readily determined unless the shape of the unsharp mask, that is, the signal Sus is determined.

The unsharp mask can be obtained by the following methods for example.

(1) The original image signal at every scanning point is stored and the memorized original image signals are read out together with the surrounding signals according to the size of the unsharp mask to obtain a mean value as the unsharp mask signal Sus. (The mean value is obtained as a simple arithmetical mean or a weighted mean of various kinds.) In this method, the unsharp mask is in the form of analog signals or in the form of digital signals after A/D conversion. Further, it is also possible to form the unsharp mask by transmitting the analog signal through a low pass filter in the primary scanning direction and processing the signal in digital form in the sub-scanning direction.

(2) After the original image signal is read out by use of a light beam or the like having a small diameter, the unsharp mask signal is read out by use of a light beam having a larger diameter. This is possible in case that the stimulable phosphor is still stimulable after the first stimulation.

(3) The expansion of the diameter of the stimulating light beam which occurs while the beam passes through the stimulable phosphor layer by scattering is utilized. When the stimulating light beam scans the stimulable phosphor, the original image signal Sorg is obtained on the incident side of the phosphor layer and the unsharp mask signal Sus is obtained on the opposite side of the phosphor layer. In this case, the size of the unsharp mask can be controlled by changing the extent of the light scattering effect by the phosphor layer or changing the size of the aperture used for receiving the scattering light.

Among the above three methods, the first method is the most preferable from the viewpoint of flexibility in image processing.

In order to carry out the first method, the following operation for the arithmetic mean is conducted for every scanning point to obtain the unsharp mask signal Sus:

$$Sus = \sum_{i,j \in 0} \alpha_{ij} Sorg(i,j) \qquad (2)$$

where i and j are coordinates of a circular area having the scanning point at the center thereof and $\alpha_{ij}$ is a weighting coefficient which should preferably have a smooth variation in all the radial directions isotropically and satisfies the formula $$\sum_{i,j \in 0} \alpha_{ij} = 1.$$

The circular area includes N number of picture elements in the direction of the diameter thereof.

However, in order to simply carry out the above operation, it is necessary to conduct $$\frac{\pi}{4} N^2$$

multiplications and $$\frac{\pi}{4} N^2$$

additions. Therefore, when N is a large number it takes a very long time to conduct the operation, which is impractical. Since it is necessary to scan the stimulable phosphor plate with a sampling rate of 5 to 20 pixel/mm (50 to 200μ to in terms of the size of the picture element) in order to preserve the necessary frequency components of the image, the number of the picture elements (N) included in the unsharp mask corresponding to the super-low frequency is inevitably large and accordingly it takes a very long time to conduct the above operation. For instance, in case of using an unsharp mask having a weighting coefficient having a Gaussian distribution, N is about 50 when the size of the picture element is 100μ=100μ to and fc=0.1 cycle/mm and about 250 if fc=0.02 cycle/mm. This means that the time for conducting the above operation will be considerably long.

Further, in order to obtain the arithmetic mean for the circular area, the range in which the addition is to be conducted should be changed for every scanning line, which makes the operating mechanism very complex and costly.

Therefore, it is desirable to simplify the operation to reduce the time for conducting the operation to obtain the unsharp mask signal. One example of such simplification methods is to obtain the simple arithmetic mean (non-weighted arithmetic mean) over a rectangular area enclosed with two lines parallel to the primary scanning direction and two lines parallel to the sub-scanning direction. In other words, the unsharp mask signal Sus is obtained by calculating the simple arithmetic mean of the original image signals Sorg within the rectangular area. Another example of such simplifications is to form a blurred signal in the primary scanning direction by transmitting the analog signal of the original image signal through a low-pass filter and then obtaining the arithmetic mean of the A/D converted digital signals in the sub-scanning direction.

In the former method in which the unsharp mask signal Sus is obtained by a simple arithmetic mean within a rectangular area, it has been proved by the present inventors that the results in the diagnostic efficiency and accuracy were as good as those obtained by use of the ideal circular unsharp mask having a Gaussian distribution in its weighting coefficient, although the above method should have defects in that the rate of unsharpness is different in the direction and further the transfer function has an undesirable fluctuation as compared with the mask having a smoothly changing weighting coefficient in the form of Gaussian distribution. Further, this method is much more advantageous in that the operation is very simple and accordingly does not take a long time, which results in high speed and low cost of the image processing apparatus. These advantages are true for both the analog and digital signals.

In more detail, in case that the weighting coefficient $\alpha_{ij}$ is to be multiplied by the original signal Sorg (i,j) at every scanning point (i,j), the unsharp mask signal Sus (IJ) is obtained by the operation represented by the formula $$Sus(IJ) = \sum_{i,j} \alpha_{ij} \cdot Sorg(i,j) \qquad (3)$$

where i, j are numbers indicating the coordinate of the scanning point or picture element, and I, J are numbers indicating the coordinate of the unsharp mask $$\left( \sum_{i,j} \alpha_{ij} = 1 \right).$$

Therefore, the number of calculations is about $N^2$ multiplications and about $N^2$ additions, N being the number of the picture elements included in an unsharp mask arranged in one direction. Accordingly, when the number of the picture elements within the unsharp mask is large it takes a very long time to obtain the unsharp mask signal Sus. For example, therefore, when the size of the unsharp mask is 6 mm×6 mm and 3600 picture elements (0.1 mm×0.1 mm) are included in the unsharp mask, 3600 multiplications and 3600 times of additions must be repeated. When an 8 bit microcomputer is used to conduct these calculations with 3 msec for one multiplication and 5 μsec for one addition, it takes about 3 msec×3600+5 μsec ×366≈11 sec to obtain one unsharp mask signal.

In contrast to this, in accordance with the above mentioned former method using the simple arithmetic mean, the time taken for obtaining the unsharp mask signal can be considerably reduced. For example, it only takes 18 msec for obtaining one unsharp mask signal. Further, by use of the algorithms mentioned below the number of calculations can be reduced to only four, which results in a very shortened time of operation of only several tens of μsec for obtaining one unsharp mask signal Sus. In other words, the unsharp mask signal Sus(IJ) can be obtained by $$Sus = \frac{1}{N^2} (\Sigma Sij) \qquad (4)$$

which means only $N^2$ times of additions and one division. In more detail, when the unsharp mask has a rectangular shape having a size of $N_1$ in the primary scanning direction and $N_2$ in the sub-scanning direction in terms of the number of picture elements, the unsharp mask signal Sus(IJ) is represented by the formula of $$Sus(IJ) = \frac{1}{N_1 \times N_2} (\Sigma Sij) \quad (5)$$

wherein
i is a number in the range of $$I - \frac{N_1 - 1}{2} \text{ to } I + \frac{N_1 - 1}{2}$$

j is a number in the range of $$J - \frac{N_2 - 1}{2} \text{ to } J + \frac{N_2 - 1}{2}$$

and $N_1$ and $N_2$ are positive odd numbers. This means that the unsharp mask signal can be obtained by $N_1 \times N_2$ times of additions and only one division. Further, by improving the process of operation the number of calculations to obtain one unsharp mask signal can be reduced to four on the average.

Since the modulation transfer function of the rectangular unsharp mask having a uniform weighting is a sinc function $$\left( \text{sinc } (x) = \frac{\sin \pi x}{\pi x} \right),$$

the aforesaid definition that the spatial frequency fc in which the modulation transfer function becomes 0.5 is 0.01 to 0.5 cycle/mm, preferably 0.02 to 0.15 cycle/mm is equivalent to a rectangular unsharp mask size of 60 mm to 1.2 mm, preferably 30 mm to 4 mm. Further, in case that the shape of the unsharp mask is an elongated rectangle, each side of the rectangle is preferred to have a length within the above range. In case of the image processing of a linear tomograph, the unsharp mask is preferred to have an elongated rectangular shape.

In the latter method in which a low-pass filter is used for obtaining a unsharp mask signal Sus, it has also been proved by the present inventors that the results in respect to diagnosis efficiency and accuracy were as good as those obtained by use of the ideal circular unsharp mask having a varying weighting coefficient, although the above method does not have a uniform balanced weighting coefficient. Further, this method is much more advantageous in that the operation is very simple and accordingly does not take a long time by only performing a low-pass filtering of the analog signal in the primary scanning direction thereby making the operation of the digital signals that will take some time unnecessary. This results in high speed and low cost of the image processing apparatus. In addition, if the addition of the digital signals in the sub-scanning direction is made to be a simple arithmetic addition to obtain an arithmetic mean, there is no need to conduct multiplication, which also results in simplification of the apparatus and speed up of the operation. It has also been proved by the present inventors that even with such a very simplified method the resulting diagnostic efficiency and accuracy is not substantially lower than that resulting from the method in which the unsharp mask is obtained through an ideal operation which requires a long time.

In the present invention, it is possible to conduct a smoothing process in addition to the above mentioned unsharp masking process. In general, since there appear noises particularly in the high frequency range, the diagnostic efficiency and accuracy is normally enhanced by conducting a smoothing process. As for the smoothing process, it is desirable to make the modulation transfer function not less than 0.5 at the spatial frequency of 0.5 cycle/mm and not more than 0.5 at the spatial frequency of 5 cycle/mm. The desired extent of smoothing depends upon the type of the radiation image. For instance, in the case of a chest tomography in which a pattern having a comparatively low frequency is to be observed, it is desired that the noise be removed as much as possible. To the contrary, in the case of an angiograph which includes fine patterns such as fine blood vessels corresponding to high frequencies, too much smoothing will adversely affect the fine patterns and lower the quality of the image. According to research by the present inventors, however, the diagnostic efficiency and accuracy are enhanced for almost all kinds of radiation images when the smoothing process is conducted within the stated range. Furthermore, is has also been confirmed that the smoothing process is effective not only when it is applied to the signal S' after the unsharp masking process but also when it is applied directly to the original image signal Sorg.

Further, in this invention, gradation processing can be conducted in addition to the above unsharp masking process. The gradation processing (such as contrast enhancement using non-linear or linear signal transformation) is particularly effective for a radiation image in which the density or intensity of emitted light is gently changed over a wide range such as the image of lung cancer or mammary cancer. Gradation processing applicable to the radiation image recording system is shown in Japanese Patent Application Nos. 53(1978)-163573, 54(1979)-23091 and 54(1979)-23092 filed by the same applicant. The gradation processing can be conducted before or after the unsharp masking process.

The stimulable phosphor referred to herein means phosphor which is able to store radiation energy upon exposure thereof to a radiation such as light or high energy radiation and then emits light according to the stored energy upon optical, thermal, mechanical, chemical or electrical stimulation. The stimulable phosphor is desired to emit light having a wavelength within the range of 300 to 500 nm. For example, rare earth activated alkaline earth metal fluorohalide phosphor is preferred. One example of this phosphor is, as shown in Japanese Patent Application No. 53(1978)-84742, a phosphor represented by the formula $(Ba_{1-x-y},Mg_x,Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in Japanese Patent Application No. 53(1978)-84744, a phosphor represented by the formula $(Ba_{1-x}, M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be in this invention can be used ZnS:Cu,Pb; $BaO \cdot xAl_2O_3$:Eu wherein $0.8 \leq x \leq 10$; and $M^{II}O \cdot xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as shown in Japanese Patent Application No. 53(1978)-84740. Furthermore, as the stimulable phosphor can be LnOX:xA wherein Ln is at least one of La, Y, Gd and Lu, X is at least one of Cl and Br, A is at least one of Ce and Tb, x is a number satisfying 0×0.1, as shown in Japanese Patent Application No. 53(1978)-84743. Among the above enumerated phosphors, rare earth activated alkaline earth metal fluorohalide phosphors are the most preferable, among which barium fluorohalides are the most preferable in view of the high intensity of emission of light.

Further, it is desirable to color the phosphor layer of the stimulable phosphor plate made of the above phosphor by use of pigments or dyes to improve the sharpness of the image obtained thereby as disclosed in Japanese Patent Application No. 54(1979)-71604.

As for the stimulating rays for stimulating the phosphor after phosphor is excited with the radiation energy in an image pattern, a laser beam having high directivity is used. As the laser beam, a laser having a wavelength within the range of 500 to 800 nm, preferably of 600 to 700 nm is preferred. For example, a He-Ne laser (633 nm) or a Kr laser (647 nm) can be used. If a color filter which cuts light having a wavelength beyond the range of 500 to 800 nm is used together with a light source, a light source having a wavelength distribution beyond this range can be used.

The radiation image information read out by use of the device of this invention is used to reproduce a radiation image on a recording medium such as a silver halide photographic film, a diazo film or an electrophotographic recording material. Further, it is possible to reproduce the radiation image on a cathode ray tube.

Now the present invention will be described in more detail with reference to the accompanying drawing as briefly described below.

BRIEF DESCRIPTION OF THE DRAWING

FIGS. 7 and 8 are block diagrams which show examples of circuitry for producing the unsharp mask signal in some embodiments of the present invention, FIG. 9 is an explanatory view showing the unsharp mask, picture elements and so forth for explaining an algorithm to calculate the unsharp mask signal, FIGS. 10A to 10C are views which show the capacity of the memories used for carrying out the algorithm as explained in FIG. 9.

DESCRIPTION OF THE PREFERRED EMBODIMENTS

Now the present invention will be described in more detail with reference to its preferred embodiments applied to an X-ray image recording system utilizing a stimulable phosphor.

Figure 1:
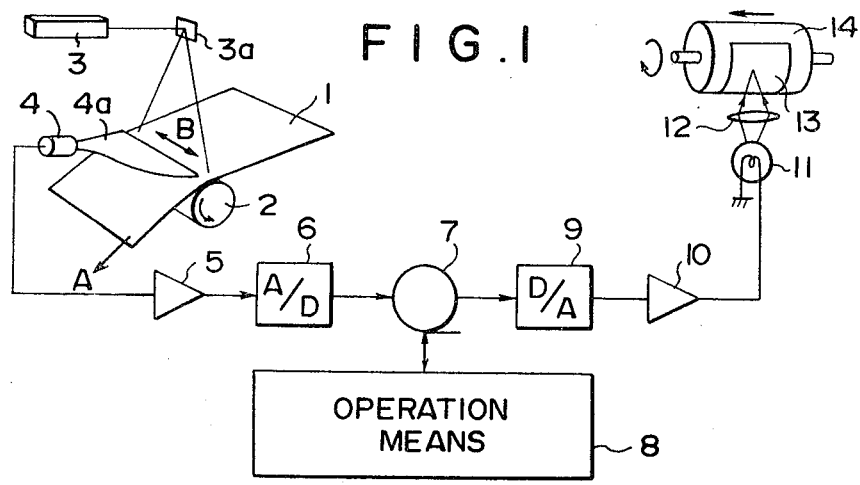
FIG. 1 shows an example of the radiation image recording system in which the image processing method of the present invention is employed.

FIG. 1 shows an example of a radiation image recording system in which the image processing method of the present invention is employed. Referring to FIG. 1, a stimulable phosphor 1 is mounted on a drum 2. The scanning mirror 3a deflects the stimulating ray from the laser source 3 in the primary scanning direction B and the drum 2 is rotated about its axis in order to move the stimulable phosphor 1 in the sub-scanning direction A. Thus, the stimulable phosphor 1 is scanned by the stimulating ray two-dimensionally. A stimulating ray source (laser) 3 is provided to emit a stimulating ray toward the drum 2. The stimulating ray emitted by the laser source 3 impinges upon the stimulable phosphor 1 mounted on the drum 2 to scan and stimulate the stimulable phosphor 1.

The light emitted by the stimulable phosphor 1 upon stimulation is received by a photodetector such as a photomultiplier 4 through a light guide member 4a. The output of the photodetector 4 is amplified by an amplifier 5 and then converted to a digital signal by an A/D converter 6. The digital signal is recorded on a magnetic tape 7.

The digital signal stored on the magnetic tape 7 is read out by an operating means 8 like a mini-computer and after the unsharp mask signal Sus is obtained the unsharp masking process is conducted. The image processing is mainly an emphasis of the super-low frequency, that is, an unsharp masking process. In addition to the unsharp masking process, variation of the emphasis coefficient $\beta$, a gradation process, an image reduction process, a smoothing process and the like are conducted to further enhance the diagnostic efficiency and accuracy of the finally resulting image.

The unsharp masking process is conducted by performing the operation represented by the formula $$S' = Sorg + \beta(Sorg - Sus). \quad (6)$$

The unsharp mask signal Sus obtained by the method as mentioned hereinafter should have a modulation transfer function of not less than 0.5 at the spatial frequency of 0.01 cycle/mm and not more than 0.5 at the spatial frequency of 0.5 cycle/mm, preferably not less than 0.5 at the spatial frequency of 0.02 cycle/mm and not more than 0.5 at the spatial frequency of 0.15 cycle/mm.

Further, in order to conduct the operation in accordance with the above formula, the emphasis coefficient $\beta$ must be determined. These values are predetermined for the various portions of the human body or the object to be diagnosed in advance or determined case by case by an external operation. After these values have been determined for the various objects, those values are stored in the memory of the operation means unit used for the signal processing.

The signal S′ obtained by the unsharp masking process as mentioned above is further subjected to a smoothing process for reducing the high frequency component. By the smoothing process, noise is reduced without affecting the information necessary for diagnosis.

The operation with the unsharp mask will hereinbelow be described in detail with reference to FIGS. 2A to 2D.

Figure 2A:
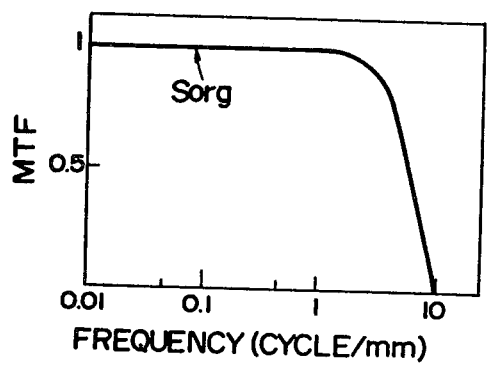
FIGS. 2A to 2D are graphs which show the steps of frequency emphasis employed in the present invention.

FIG. 2A shows the frequency response where the image recorded on the stimulable phosphor is sampled with 10 picture elements (pixel)/mm. The frequency response or the modulation transfer function (MTF) is known to be represented by a sinc function when an aperture with rectangular weighting is used as the aperture for the photo-detector and a Gaussian function when an aperture with Gaussian function weighting is used.

Figure 2B:
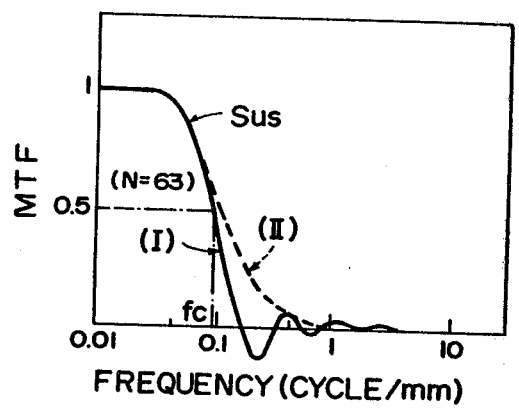

FIG. 2B shows the modulation transfer function of a rectangular unsharp mask (I) and a Gaussian unsharp mask (II) which is not less than 0.5 at 0.01 cycle/mm and not more than 0.5 at 0.5 cycle/mm. In case of the unsharp mask of the curve (I), the unsharp mask signal was calculated by obtaining an arithmetic mean of about 63 picture elements × 63 picture elements (represented by a size N=63) on the stimulable phosphor sampled with 10 picture elements (pixel)/mm. This is equivalent to the case where the image on the stimulable phosphor is scanned with a light beam having a cross-sectional size of 6.3 mm × 6.3 mm. In the case of the unsharp mask of the curve (II), the unsharp mask signal was calculated by obtaining a weighted mean with a Gaussian distribution weighting coefficient. Other factors were all the same as those used in the case of the curve (I). Tests by the present inventors showed that the results in terms of the diagnostic efficiency and accuracy were almost the same for the two unsharp masks (I) and (II) having a different shape of MTF in their high frequency range.

Figure 2C:
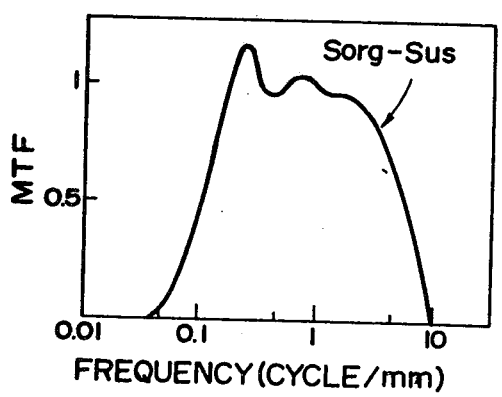

FIG. 2C shows the modulation transfer function (Sorg-Sus).

Figure 2D:
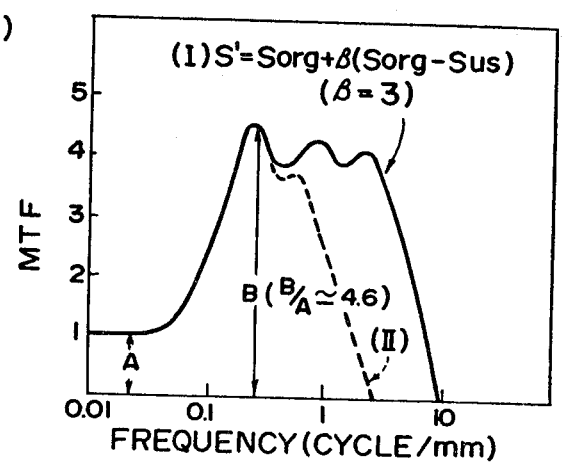

FIG. 2D shows the result of the operation at (I) corresponding to the signal S′ where the emphasis coefficient $\beta$ is fixed at 3. As a result as shown, the maximum value (B) of the MTF of the emphasized image signal is about 4.6 times as large as the value (A) of MTF which is a limit value where the spatial frequency is infinitely close to zero. The broken line (II) in the FIG. 2D shows the MTF in case that a smoothing process with 5 pixel × 5 pixel is applied to the signal S′ shown in FIG. 2D.

FIGS. 3A to 3D show the variation of the emphasis coefficient $\beta$ as a function of the brightness represented by the original image signal Sorg or the unsharp mask signal Sus. The brightness represents the image signal which is the amount of light emitted from the phosphor upon stimulation.

Figures 3A, 3B, 3C, 3D:
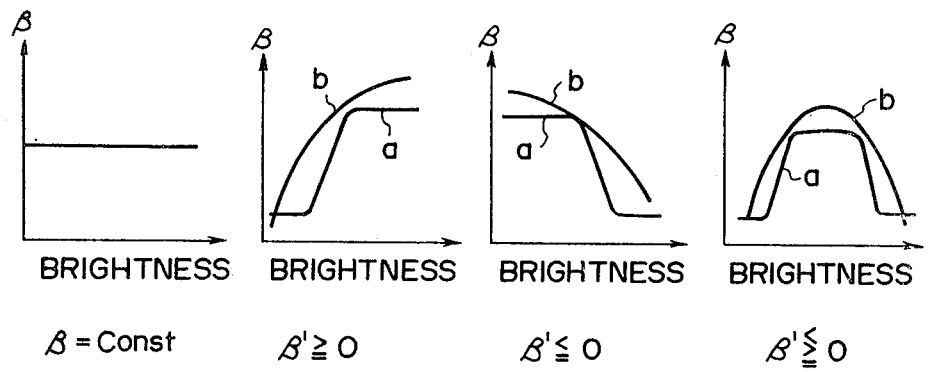
FIGS. 3A to 3D are graphs which show the various ways of changing the emphasis coefficient $\beta$ with respect to the brightness represented by the original image signal Sorg or the unsharp mask signal Sus.

FIG. 3A shows a flat type in which $\beta$ is fixed at a constant value. FIG. 3B shows a monotone increasing type ($\beta' \leq 0$), FIG. 3C shows a monotone decreasing type ($\beta' \leq 0$) and FIG. 3D shows a medium brightness emphasis type. The type as shown in FIG. 3C can also be termed a "low brightness emphasis type" such as the type shown in FIG. 3D identified as a medium brightness emphasis type, both types including a range where $\beta' \leq 0$. The variation on the emphasis coefficient $\beta$ represented by FIGS. 3B, 3C and 3D includes a stepped type as indicated by the curve a and a smooth curve type as indicated by the curve b.

By varying $\beta$ as a monotonically increasing function as shown in FIG. 3B, it is possible to prevent the formation of an artifact-image which is liable to appear with frequency emphasis. As one example thereof, if a magin-type X-ray image of a stomach obtained using a barium sulfate contrast medium is subjected to the above-discussed frequency emphasis (enhancement of particular spatial frequency components) or the unsharp masking process with the emphasis coefficient $\beta$ fixed, the boundary of the low brightness area having a uniform low brightness over a wide range corresponding to the portion containing the barium sulfate contrast medium is over-emphasized and an artifact-image having a double contour will appear. If the emphasis coefficient $\beta$ is changed so that it is made small in the low brightness region for the portion filled with the contrast medium and is made large in the high brightness region for the stomach details or the like, the occurrence of the artifact-image having the double contour can be prevented. Further, in case of a front chest image, if $\beta$ is fixed a noise increases in the low brightness region such as the back bone and the heart and in an extreme case the fine portions become saturated white (the fog level of the recording medium), which disturbs badly the visual observation and markedly lowers the diagnostic efficiency and accuracy. To the contrary, if $\beta$ is made small in the low brightness regions such as the backbone or the heart and made large in high brightness regions such as the lungs, the above mentioned noise and the saturated white areas can be reduced.

The low brightness emphasis as shown in FIG. 3C is suitable for an object in which the diagnosis of the low brightness portion is particularly important and the area of the low brightness portion does not occupy a major part of the whole image. For instance, an angiograph or lymphograph is desirable to be subjected to frequency emphasis of this type since there it is desired that the sharpness of a particular part be much increased even if noise is somewhat increased. Thus, the diagnostic efficiency and accuracy are highly enhanced in these applications by the low brightness emphasis.

The medium brightness emphasis as shown in FIG. 3D is suitable for applications in which the diagnosis of the medium brightness portion is particularly important and the low and high brightness portions occupy a major part of the whole image and are not important for diagnosis. For instance, a cholecystograph or an image of the liver is desirably subjected to the frequency emphasis of this type since in these applications it is desired that only the medium brightness portion be emphasized and the noise and the air portions which lower the diagnostic efficiency and accuracy should not be emphasized.

In any example of the above types, if the emphasis coefficient $\beta$ is fixed at a small value for the frequency emphasis, the diagnostic efficiency and accuracy are not enhanced since the contrast of the important portions such as stomach details, the blood vessels of the lung and veins are not enhanced although various artifactimages may be prevented. Thus, by changing the emphasis coefficient $\beta$ continuously according to the brightness of the image on the stimulable phosphor, it is possible to obtain a radiation image having high diagnostic efficiency and accuracy while controlling the occurrence of the artifact-image.

Figure 4:
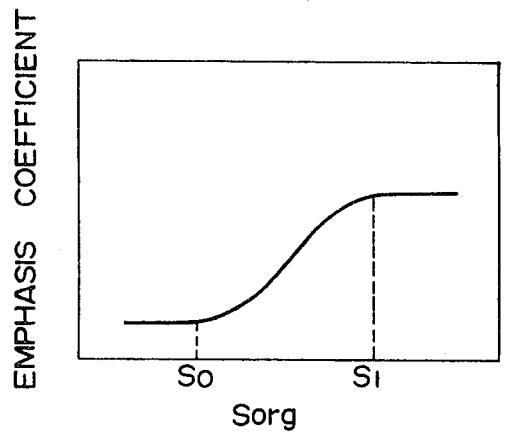
FIG. 4 is a graph which shows an example of the variation of the emphasis coefficient $\beta$ with respect to the value of the original image signal Sorg.

FIG. 4 shows another example of the change of $\beta$ according to the original image signal Sorg. In this example, $\beta$ is changed almost linearly between the maximum brightness $S_1$ and the minimum brightness $S_0$ which are obtained from a histogram of the image on the stimulable phosphor. The maximum and minimum values $S_1$ and $S_0$ are determined according to the type of the X-ray image to be processed. For instance, the maximum and minimum brightnesses may be determined as the brightness where the integrated histogram is 90 to 100% and 0 to 10%, respectively.

Figure 5:
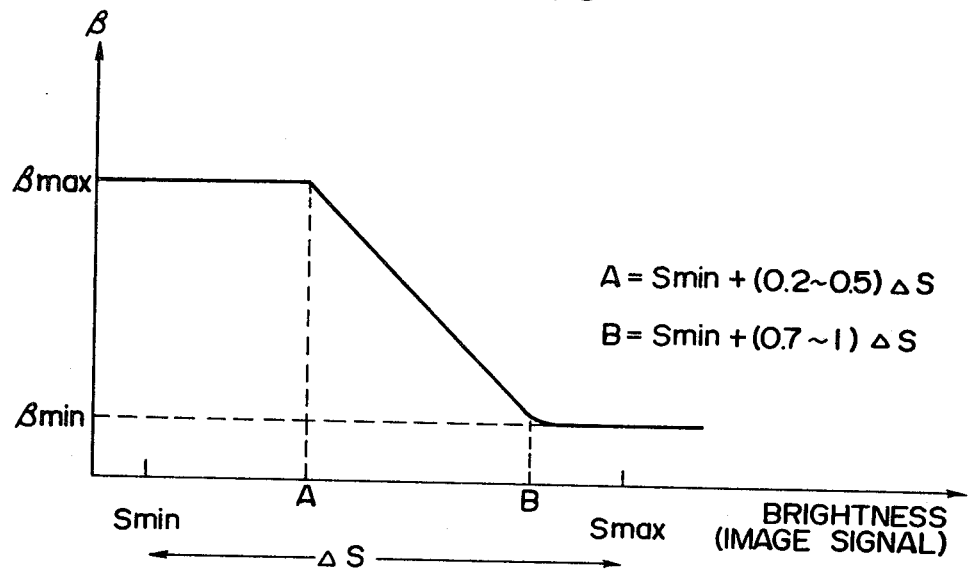
FIG. 5 and 6 are graphs which show examples of the variation of the emphasis coefficient $\beta$ with respect to the image signal.
Figure 6:
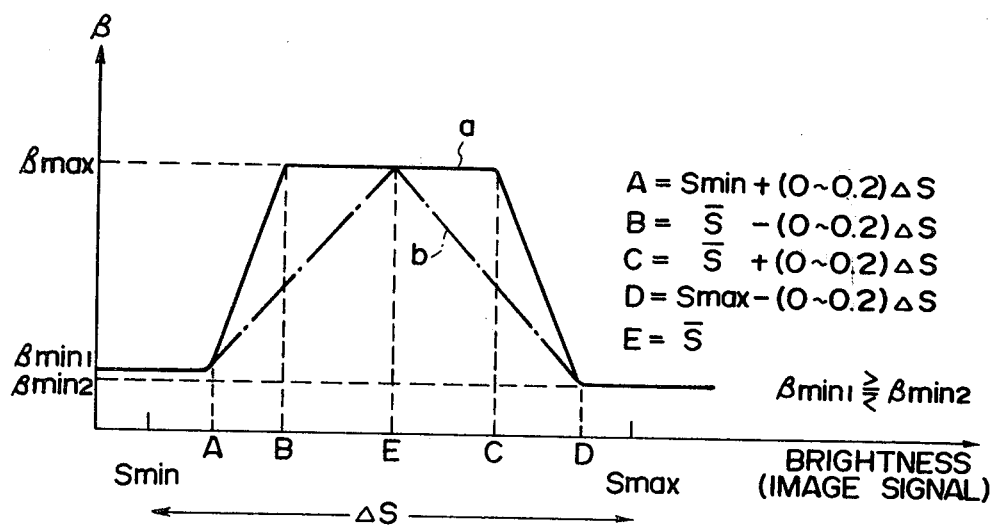

FIGS. 5 and 6 are graphs showing examples of the change of $\beta$ for the low brightness emphasis and medium brightness emphasis, respectively.

In FIG. 5, $\beta$ is decreased from the maximum value $\beta$max to the minimum value $\beta$min while the brightness changes from A to B. In other words, in the low brightness area (from Smin to A) the emphasis coefficient $\beta$ is made maximum ($\beta$max) and in the high brightness area (from B to Smax) the emphasis coefficient $\beta$ is made minimum ($\beta$min). The brightness A is desired to be a sum of the minimum brightness (Smin) and 0.2 to 0.5 times the difference ($\Delta$S) between the maximum brightness (Smax) and the minimum brightness (Smin), i.e. [Smin+(0.2 ... 0.5)×$\Delta$S]. The brightness B is desired to be a sum of Smin and 0.7 to 1 times of $\Delta$S, i.e. [Smin+(0.7 ... 1)×$\Delta$S].

In FIG. 6 as shown by the solid line a, $\beta$ is increased from the first minimum ($\beta$min1) to the maximum ($\beta$max) between brightnesses A and B, and decreased from the maximum ($\beta$max) to the second minimum ($\beta$min2) between brightness C and D. In other words, in the low brightness area (Smin to A) and the high brightness area (D to Smax) the emphasis coefficient is made small ($\beta$min1, $\beta$min2), and in the medium brightness area (B to C) the emphasis coefficient is made large ($\beta$max). The first minimum value ($\beta$min1) and the second minimum value ($\beta$min2) may be equal to each other. In case of a change as shown by the chain line b differently from the above mentioned change shown by the solid line a, the emphasis coefficient $\beta$ increases between A and E and decreases between E and D. In FIG. 6, the brightness A, B, C, D and E should preferably be the minimum brightness (Smin) plus 0 to 0.2 times the difference ($\Delta$S) between the maximum brightness (Smax) and the minimum brightness (Smin), i.e. Smin+(0 ... 0.2)×$\Delta$S, the mean brightness $$\left( \bar{S} = \frac{Smin + Smax}{2} \text{ or a statistical mean} \right)$$

minus 0 to 0.2 times the difference (S), i.e. S−(0 ... 0.2)×$\Delta$S, the mean brightness (S) plus 0 to 0.2 times said difference ($\Delta$S), i.e. S+(0 ... 0.2)×$\Delta$S, the maximum brightness (Smax) minus 0 to 0.2 times the difference ($\Delta$S), i.e. Smax−(0 ... 0.2)×$\Delta$S, and the mean brightness S, respectively.

In the above operation using the emphasis coefficient changing as shown in FIGS. 5 and 6, the maximum and minimum brightnesses (Smax), (Smin) are both the maximum and minimum brightnesses within the necessary image for diagnosis, that is, there may be more bright or less bright portions outside the substantial image within the stimulable phosphor area. When desired, the maximum and minimum brightnesses may be selected as the maximum and minimum brightnesses within the whole area of the stimulable phosphor.

Further, according to the inventors' experiments, it has been found that the results are almost the same between the emphasis coefficient $\beta$ changed with the original image signal and that changed with the unsharp mask signal.

In addition to the above mentioned frequency emphasis by use of the unsharp mask, it is possible to provide a gradation process for changing the gradation of the image. When the gradation process is conducted before the unsharp masking process, A/D conversion is conducted after the signal has been gradation processed with a non-linear analog circuit. When the gradation process is conducted after the unsharp masking process, the gradation process can be conducted digitally or may be conducted in the analog form after D/A conversion. Further, it is possible to conduct the gradation process digitally after A/D conversion before the unsharp masking process.

The data which has been subjected to the frequency emphasis and further to the gradation process as occasion demands are recorded on a magnetic tape 7. The data recorded on the magnetic tape 7 is read out and converted to an analog signal by a D/A converter 9 and the analog signal is used to modulate a recording light source 11 after being amplified by an amplifier 10. The recording light emitted by the light source 11 exposes a recording film 13 mounted on a drum 14 by way of a lens 12. The drum 14 is rotatable about its axis and movable in the axial direction. Thus, a radiation image subjected to the frequency emphasis of the unsharp masking process is recorded on the film 13. The image finally recorded on the film 13 is used for performing the diagnosis.

When the image is reproduced finally on the photographic film, a size reduced image can be obtained by recording the image with a higher sampling frequency than the frequency at the time of input scanning. For instance, if the input scanning system has a sampling frequency of 10 pixel/mm and the output scanning system has a sampling frequency of 20 pixel/mm, the finally obtained image has a ½ reduced size with respect to the original image size.

A size reduced image having a reduction rate of ½ to ⅓ is desirable for enhancing further the diagnosis efficiency and accuracy since the frequency component which is necessary for diagnosis is close to the frequency at the highest visibility and accordingly the contrast appears to have been raised to the observer.

Now, the preferred methods of operation for obtaining the unsharp mask signal will be described in detail.

FIG. 7 shows an example of one method for carrying out the operation for obtaining the unsharp mask signal Sus. Referring to FIG. 7, the output of the photodetector 21 which measures the light emitted from the stimulable phosphor upon stimulation is amplified by an amplifier 22 which performs amplification including non-linear correction or band compression such as logarithmic conversion to obtain an original image signal Sorg. The original image signal Sorg is fed to an operation unit 23 for conducting the unsharp masking process with formula (1) on one hand and on the other hand sent to a low-pass filter 24 to obtain the unsharp mask signal Sus. In the low-pass filter 24, the analog value of Sorg is filtered with only its super-low frequency component being transmitted therethrough and then converted to a digital signal Si by an A/D converter 25. The converted digital signal is used for calculating an arithmetic mean value $$Sus = \sum_{i=j}^{N} a_i \cdot Si$$

by a digital calculating circuit 26. The obtained value is fed to the operation unit 23 as the unsharp mask signal Sus. In this formula, $a_i$ is a weighting coefficient for the signal Si coming from the A/D converter 15. In case of a simple arithmetic mean, $a_i$ is made to be equal to 1/N, N being the number of the scanning lines counted in the sub-scanning direction over a range to be covered by an unsharp mask.

As shown in FIG. 7, the original image signal Sorg is fed to the operation unit 23 in the form of an analog signal. Since this signal Sorg has been obtained before the unsharp mask signal Sus is fed to the unit 23, it is necessary to delay the input of the original image signal Sorg so that both the signals Sorg and Sus are simultaneously fed to the unit 23. Alternatively, the original image signal Sorg may be stored in a memory after being converted to a digital value and read out from the memory when it is used together with the unsharp mask signal Sus. In any way, it is necessary to delay the input of the original image signal Sorg into the unit 23 by the time required for the unsharp mask signal Sus to be calculated through the low-pass filter 24, the A/D converter 25 and the circuit 26, so that the signals Sorg and Sus are fed to the operation unit 23 simultaneously.

In the above circuit, the output of the photodetector 21 represents the intensity of the light emitted from the stimulable phosphor upon stimulation which changes over a wide dynamic range. Accordingly, it is impractical to directly process the output signal that changes over such a wide dynamic range. It is, therefore, desirable that the dynamic range of the signal be compressed. For example, the signal is desired to be converted to a value corresponding to the final optical density. In order to perform the compression of the output signal in such a manner, it is desirable to log-compress the output signal, a technique generally known in light measuring circuit incorporated in a camera. The log-compression can be conducted by the amplifier 22 which then performs non-linear type amplification or conversion of the signal.

The cut-off frequency of the low-pass filter 24 is selected taking into account the spatial frequency of 0.01 to 0.5 cycle/mm or preferably 0.02 to 0.15 cycle/mm, the picture element size (mm/pixel), and the picture element frequency (pixel/sec). Specifically, the cut-off frequency (6 dB down) of the low-pass filter 24 designated by $f_{LP}$ (cycle/sec) is determined by the formula $$f_{LP}(\text{cycle/sec}) = f_c(\text{cycle/mm}) \times d(\text{mm/pixel}) \times n\text{-(pixel/sec)} \quad (7)$$

where the desired spatial frequency is $f_c$(cycle/mm), the picture element size is d(mm/pixel), and the picture element frequency in the primary scanning direction is n(pixel/sec).

It will be noted that the output of the photodetector 21 which has been described as amplified before the low-pass filtering in the above example shown in FIG. 7 may be amplified after the low-pass filtering as shown in FIG. 8. In the example shown in FIG. 8, the output of the photodetector 21 is divided into two outputs one of which is fed to a low-pass filter 24 and the other of which is fed to an amplifier 22a which performs, if necessary, non-linear correction such as log-compression. The output of the amplifier 22a is taken out as an original image signal Sorg and on the other hand the output of the low-pass filter 24 is fed to another amplifier 22b equivalent to the amplifier 22a. The output of the amplifier 22b is fed to the calculating circuit 26 for obtaining an arithmetic mean value Sus=$\Sigma a_i$Si through an A/D converter 25. The output of the calculating circuit 26 is the unsharp mask signal Sus and is fed to an operation unit 23 for performing the unsharp masking process together with the original image signal Sorg by use of the formula
$$S' = \text{Sorg} + \beta(\text{Sorg} - \text{Sus}).$$

FIG. 9 illustrates the picture elements and the algorithm which is preferred in calculating the unsharp mask signal in accordance with another preferred embodiment of the present invention.

Referring to FIG. 9, it is assumed that an unsharp mask $M_{I,J}$ is rectangular as indicated with a solid line enclosed with two parallel lines extending in the primary scanning direction and two parallel lines extending in the sub-scanning direction. In the drawing, the primary scanning direction means the horizontal scanning direction. The sub-scanning direction means, of course, the vertical scanning direction. In order to simplify the following explanation, the unsharp mask is assumed to be square. The length of one side of the square mask is N in terms of the number of the picture elements, where N is a positive odd number. The unsharp mask $M_{I,J}$ is calculated for the signal $S'_{I,J}$ based on all of the original image signals for the picture elements included in the mask $M_{I,J}$. $S'_{I,J}$ is the final signal to be obtained by the formula [$S' = \text{Sorg} + \beta(\text{Sorg}-\text{Sus})$] for a scanning point (picture element) at the center of the mask. $S_{I,J}$ is the original image signal for the picture element $P_{I,J}$ at the top of the mask $M_{I,J}$. After obtaining the value of $S_{I,J}$, calculation of the unsharp mask finally becomes possible. $T_{I,J}$ is the total sum of all the signals of the picture elements within the mask $M_{I,J}$ having a number of $N^2$, that is $$T_{I,J} = \sum_{j=J-N+1}^{J} \sum_{i=I-N+1}^{I} S_{ij}. \quad (8)$$

At first, a signal $S_{IJ}$ of the picture element $P_{IJ}$ is stored in the corresponding address of the sum S in memory. Each address should have a number of bits capable of indicating the signal value of the picture element, for instance 8 bits.

Then, the sum $C_{IJ}$ of the signals of the N picture elements in the direction of primary scanning represented by the formula $$C_{IJ} = \sum_{i=I-N+1}^{I} S_{ij} \quad (9)$$

is obtained. This can be obtained by a formula
$$C_{IJ} = C_{I-1,J} + S_{I,J} - S_{I-N,J} \quad (10)$$

by use of the sum $C_{I-I,J}$ of the signals of the N picture elements arranged before the picture element $P_{IJ}$ in the line of the element $P_{IJ}$, the signal $S_{I-N,J}$ of the picture element located at N picture elements before the picture element $P_{IJ}$, and the signal $S_{IJ}$ of the picture element $P_{IJ}$. The sum $C_{IJ}$ is stored in the corresponding address of the sum C in memory. Each address of this memory has a number of bits sufficient for preventing overflow, which depends upon the number N.

Then, the total sum $T_{IJ}$ of the signal of the $N^2$ picture elements within the mask $M_{IJ}$ is obtained. This can be obtained by the formula $$T_{IJ} = T_{I,J-L} + C_{I,J} - C_{I,J-N} \tag{11}$$

by use of the total sum $T_{I,J-I}$ of the signal of the $N^2$ picture elements within the mask $M_{I,J-I}$ which is one line back to the sub-scanning direction from the mask $M_{I,J}$ including the picture elements $P_{I,J}$, the sum $C_{I,J-N}$ of the signals of the N picture elements in the last line of the mask $M_{I,J-I}$ which is not contained in the mask $M_{IJ}$, and the sum $C_{IJ}$ of the signals of the picture elements in the top line including the picture element $P_{IJ}$. The obtained value $T_{IJ}$ is stored in the corresponding address of the total sum T in memory. Since a total sum $T_{IJ}$ is the value $N^2$ times as large as the unsharp mask value, the unsharp masking process can be conducted by use of this value with the formula $$S_{IJ}' = S_I - \frac{N-1}{2}, \tag{12}$$
$$J - \frac{N-1}{2} + \beta \left( S_I - \frac{N-1}{2}, J - \frac{N-1}{2} - \frac{T_{IJ}}{N^2} \right).$$

The capacity of memory required for the above operation will be described hereinbelow. FIG. 10A shows a memory for the signal-S of $S_{IJ}$ which should have $$\frac{N+1}{2}$$

words in the sub-scanning direction and Nm words in the main scanning direction. Nm is a total number equal to or close to the number of all the picture elements in the main scanning direction. One word of this memory may have 8 bits for instance. FIG. 10B shows a memory for the sum $C_{IJ}$ which should have N+1 words in the sub-scanning direction and Nm words in the main scanning direction. One word of this memory should have two or three times as many bits as the above word for $S_{IJ}$. FIG. 10C shows a memory for the total sum $T_{IJ}$ which should have only two words in the sub-scanning direction and Nm words in the main scanning direction.

Figure 11:
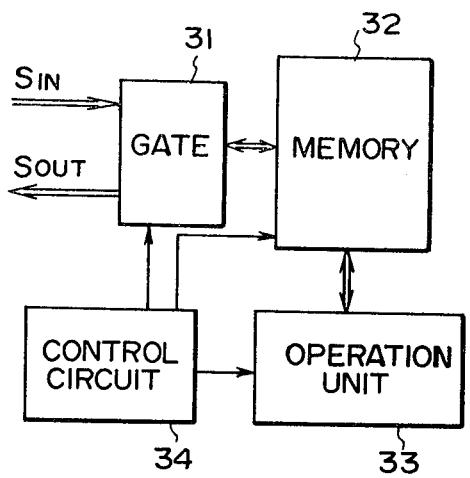
FIG. 11 is a block diagram which show an example of the circuitry for carrying out the algorithm as explained in FIG. 9, FIGS. 12 and 13 are views which show the variations of the memories used for carrying out the above algorithm.

FIG. 11 shows an example of a circuit in block diagram form for carrying out the above operation. The original image input signal $S_{IN}$ fed to a gate 31 is transmitted to a memory 32 having the required capacity and stored therein. Based on the stored information, an operation unit 33 performs the desired operation. The gate 31, memory 32, and operation unit 33 are controlled by a control circuit 34. The results of the operation by the operation unit 33 is output from the gate 31 through memory 32 as an image output signal $S_{OUT}$.

According to the above method of operation, the operation for obtaining the unsharp mask signal Sus is markedly simplified and accordingly the apparatus for carrying out the operation is also simplified to a great extent. This simplification is based on the method utilizing the rectangular mask and obtaining a simple arithmetic mean of the signals within the rectangular mask. In other words, in accordance with this method calculating the simple arithmetic mean of the signals within a rectangular mask, a markedly simplified algorithm as explained above can be utilized and the operation can be markedly simplified. Thus, the radiation image processing can be very simply put into practice in accordance with this invention.

Figure 12:
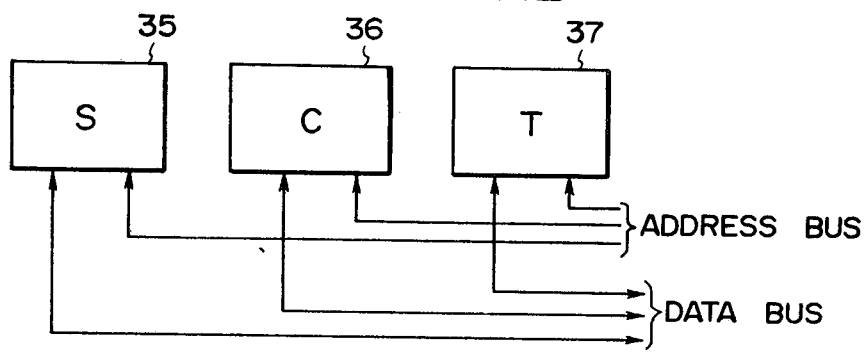
Figure 13:
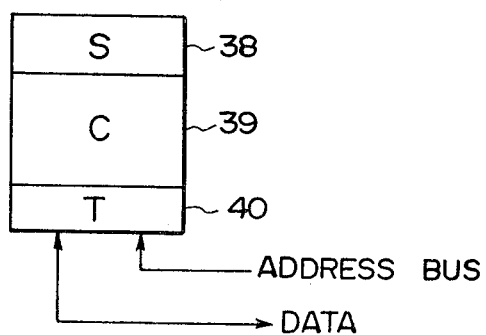

Further, in the above explanation, the memories for the three kinds of information 35, 36 and 37 may be divided as shown in FIG. 12 so that the address bus and the data bus are divided into three groups and the three kinds of information can be simultaneously accessed. Further, as shown in FIG. 13, it is possible to connect the three memories in series so that the addresses are continued in the three memories in series. In the example as shown in FIG. 13, the time for operation is further shortened.

The control circuit and the operation unit may be implemented using particularly designed hardware such as PLA (Programmable Logic Array) or Random Logic Circuits. Or, a microcomputer or a mini-computer can be used for the control circuit and operation unit. Or, a micro-computer, for example of a bit slice type, may be used for the control circuit and a particularly designed circuit may be used for the operation unit. In a practical circuit implementation, the hardware is selected according to the required operation speed.

Figure 14:
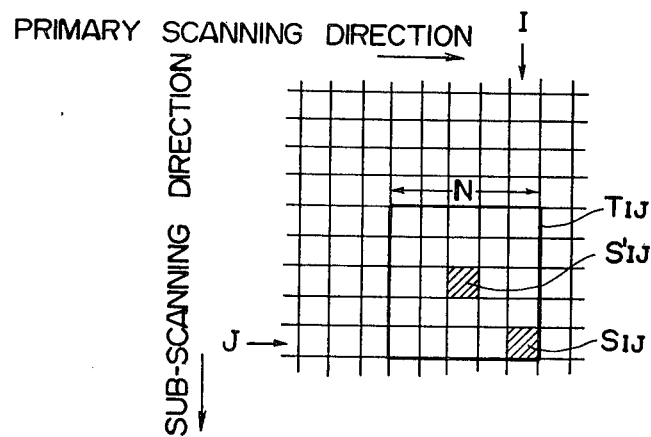
FIG. 14 is an explanatory view showing the unsharp mask, picture elements and so forth for explaining another algorithm to calculate the unsharp mask signal.

Another algorithm which enables further reduction of the capacity of the memory will be described hereinbelow referring to FIGS. 14, 15 and 16.

In this algorithm, after the signal $S_{IJ}$ of the top picture element $P_{IJ}$ in the unsharp mask $M_{IJ}$ is stored in the corresponding address in memory for S, the sum $E_{IJ}$ of the signals of the N picture elements in the subscanning direction, that is $$E_{I,J} = \sum_{j=J-N+1}^{J} S_{IJ} \tag{13}$$

is calculated and is stored in the corresponding address in memory for E. This calculation is conducted by use of the formula $$E_{I,J} = E_{I,J-I} + S_{I,J} - S_{I,J-N} \tag{14}$$

By use of the stored values, the total sum $T_{I,J}$ which is $N^2$ times as large as the unsharp mask signal value is obtained by use of the formula $$T_{I,J} = T_{I-I,J} + E_{I,J} - E_{I-N,J} \tag{15}$$

By this method it is possible to carry out the calculation (of the formula (15)) when the primary scanning returns from the right end to the left end. Therefore, the sum on the N signals $S_{I,J}$ of left side of the primary scanning line that is indicated by $R_J$ represented by the formula $$R_J = \sum_{i=1}^{N} S_{i,j} \tag{16}$$

is calculated at first and is stored in the corresponding address in memory for R. The value $R_J$ is, as shown in FIG. 16, represented as $R_1$, that is, the sum of $S_{1,1}$ to $S_{5,1}$ and $R_5$, that is, the sum of $S_{1,5}$ to $S_{5,5}$ when N=5, for instance. When the picture element changes from $S_{5,5}$ to $S_{6,5}$, the value $R_5$ does not change.

Therefore, when the primary scanning returns from the right end to the left end, the value $T_{I,J}$ is obtained by use of $R_J$ by the formula $$T_{I,J} = T_{I,J-1} + R_J - R_{J-N} \tag{17}$$

By use of the thus obtained $T_{I,J}$, the unsharp masking process is conducted by the formula $$S_{I,J}' = S_I - \frac{N-1}{2},$$
$$J - \frac{N-1}{2} + \beta \left( S_I - \frac{N-1}{2}, J - \frac{N-1}{2} - \frac{T_{IJ}}{N^2} \right). \tag{18}$$

Figure 15A:
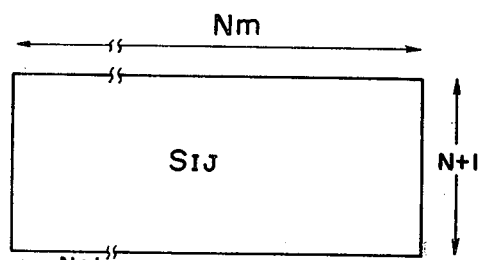
FIGS. 15A to 15D are view which show the capacity of the memories used for carrying out the algorithm as explained in FIG. 14.
Figure 15B:
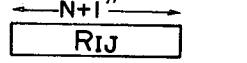
Figure 15C:
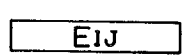
Figure 15D:
Figure 16:
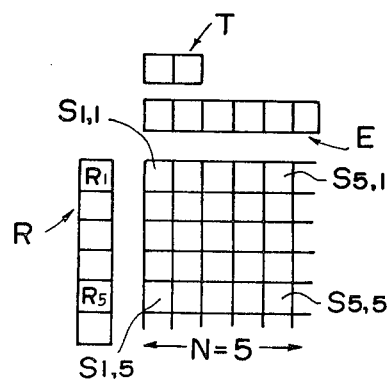
FIG. 16 is a partial explanatory view which explains in more detail the algorithm as explained in FIG. 14, FIGS. 17A, 17B and 19 are graphs which show the relationship between the emphasized frequency and the evaluation of the resulting images in diagnostic efficiency and accuracy.

This algorithm requires memory for the signal $S_{I,J}$ which has $N+1$ words in the sub-scanning direction and Nm words in the primary scanning direction as shown in FIG. 15A. However, this algorithm only needs very small memories for R, E and T as shown in FIGS. 15B, 15C and 15D. Memory for R and E requires $N+1$ words and memory for T only needs two words. One word of memory used for S may only need for instance 8 bits, but one word of memory used for R, E and T requires for instance 16 bits depending on the value of N. The capacity of a memory using longer bit lengths is reduced, therefore, this algorithm is very advantageous in that the total memory capacity is very small. Thus, the capacity of memory shown in FIGS. 15A to 15D is far smaller than the capacity of memory shown in FIGS. 10A to 10C, which is effective to simplify the whole apparatus for carrying out the radiation image processing method.

The above two algorithms are of a digital processing type in which signals are processed in the digital form. It is, however, possible to integrate the analog signal in the primary scanning direction and store the integrated value in memory and then conduct a numerical integration of the stored values in the sub-scanning direction to obtain the unsharp mask signal Sus. In this case, since the analog value is integrated for every picture element, N analog integration circuits are required. The number of the analog integration circuits, however, can be reduced to only one by use of the following method.

That is, the analog output Sorg of the scanning point is divided into two signals one of which is delayed by a delay circuit. The delayed signal and the other signal are fed to a differential signal operation circuit which gives an output representing the difference between the two input signals (Sorg-TSorg). The delayed signal TSorg is a signal delayed by a delay time (T) which is represented by the product of a scanning time ($\tau$) of one picture element and the number of the picture elements (N) in the unsharp mask counted in the primary scanning direction, i.e. $T = \tau \times N$. The output of the differential signal operation circuit is integrated to obtain the total sum of the Sorg by the formula $$\int_{-\infty}^{t} (Sorg - TSorg) = \tag{19}$$
$$\int_{-\infty}^{t} Sorg - \int_{-\infty}^{t-N\cdot\tau} Sorg = \int_{t-N\cdot\tau}^{t} Sorg$$

The integrated value corresponds to the value $C_{I,J}$ shown in FIGS. 9 and 10 which is added in the sub-scanning direction by a digital operation to obtain the value $T_{I,J}$. Then, by use of the value $T_{I,J}$, the unsharp mask Sus is obtained as mentioned hereinbefore. This is also a method which is capable of calculating the desired value (Sus) at a high speed and easily, that is a preferred method as an analog type operation.

Further, the unsharp mask Sus(IJ) is a value obtained from the signals $S_{ij}$ within the mask having a scanning point (ij) at its center and covering the scanning points within an area of $$\frac{N_1 - 1}{2} < i < N_x - \frac{N_1 - 1}{2} \tag{20a}$$

$$\frac{N_2 - 1}{2} < j < N_y - \frac{N_2 - 1}{2} \tag{20b}$$

where $N_x$ is the number of picture elements in the primary scanning direction and $N_y$ is the number of picture elements in the sub-scanning direction. Therefore, it is impossible to obtain the unsharp mask signal of a scanning point at the edge of the image since some of the signals around the scanning point at the edge of the image are not defined.

In order to obtain the unsharp mask signal Sus for scanning points at a edge of the image, it is the simple and advantageous method to store the signals of the outermost picture elements (i.e. picture elements at the edge of the image) and use the store signals for the imaginary picture elements around the image assuming that the signal of the outermost picture elements is the same for the imaginary picture elements around the image. Or, it is possible to assume that the imaginary picture elements around the image are black or white, or to have an intermediate value between black and white.

Further, in the above embodiments, the original image signal Sorg includes the signal which has been subjected to the band compression and or non-linear correction like logarithmic compression. In practical use, the original image signal is desired to be signal subjected to a band compression like log-compression or the like since the signal is the output of the photodetector which represents the level of brightness. It is of course possible to use directly the output signal of the photodetector as Sorg without any processing. Further, theoretically, the calculation of the unsharp mask signal should be based on the signal representing the energy itself. According to the experiments, however, it has been proved that the mean value obtained based on the log-compressed value corresponding to the density and not to the energy showed the same results from a viewpoint of diagnostic efficiency and accuracy. This is very convenient and advantageous in conducting the operation.

The present invention is not limited to the above embodiments and many variations thereof are possible.

The read-out of the image in the phosphor can be conducted by use of a rotating drum on which the phosphor plate is mounted or by use of a flat support movable for scanning on which the phosphor plate is mounted. The phosphor may be also scanned optically by laser beam scanning. Or, the read-out may be conducted by use of a beam scanning system such as a flying spot scanner.

Further, though in the above embodiment the digital output of the A/D converter 6 is first stored on a magnetic tape and the aforesaid operation is conducted based on the stored output, it is possible to process the signal in real time and directly send the processed signal to the reproduction station. Further, the operation of the unsharp mask signal may be conducted off line after recording the necessary information on a magnetic tape or on line with the information stored temporarily in core memory.

Now the present invention will be further described with reference to several examples thereof.

EXAMPLE I

More than 100 samples of typical radiation images of various portions of a human body were examined both in a form of the conventional radiograph and in the form of radiation images recorded on a recording medium by way of the radiation image processing method in accordance with this invention. Particularly, the diagnostic efficiency and accuracy were compared between those two types of images. For examining the various factors in this invention, the emphasis coefficient $\beta$ and the spatial frequency fc at which the modulation transfer function is 0.5 were variously changed. As the unsharp mask, a circular area in which the image signals were averaged by use of a Gaussian weighted mean was employed.

The results were evaluated by four radiologists since it was impossible to evaluate the diagnostic efficiency and accuracy by standard objective physical photographic characteristics sharpness, contrast and granularity.

The standard of evaluation was as follows.

+2: The diagnostic efficiency and accuracy were greatly enhanced and improved. For instance, diseased portions which were not recognized in the conventional radiograph have become recognizable, or diseased portions which were very difficult to recognize have become clearly recognizable.

+1: The diagnostic efficiency and accuracy were improved. For instance, the diseased portions which were difficult to recognize have become recognizable.

0: The diagnostic efficiency and accuracy were not so improved, though the image has become somewhat clearer.

−1: The diagnostic efficiency and accuracy were lowered in some parts while they were improved in other parts.

−2: The diagnostic efficiency and accuracy were lowered with no parts improved.

Figure 17A:
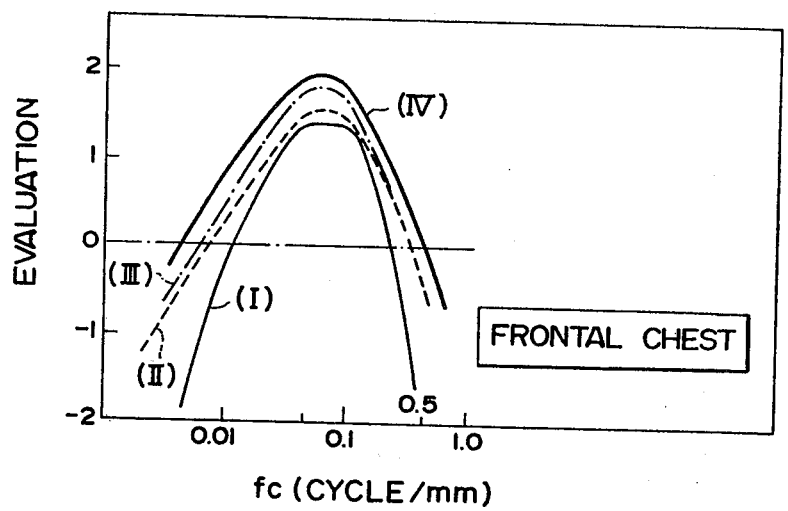
Figure 17B:
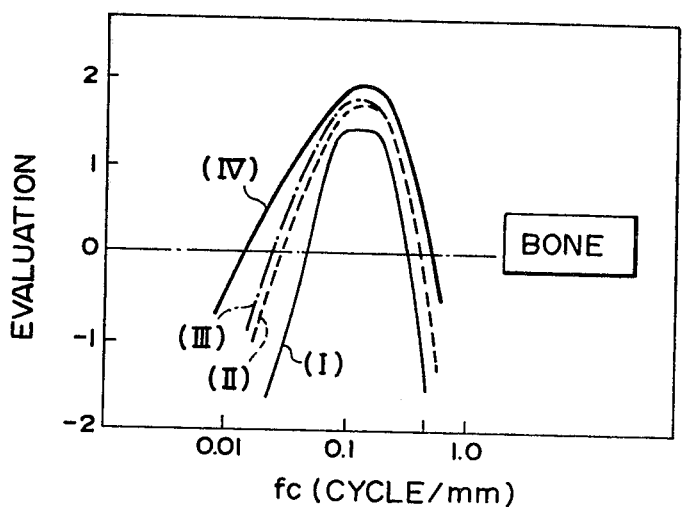

FIGS. 17A and 17B show the results of the relationship between the evaluation of the obtained image and the frequency fc at which the modulation transfer function became 0.5. FIG. 17A shows examples of a frontal chest image, and FIG. 17B shows examples of the bones. The thin solid line (I) shows the results where the emphasis coefficient $\beta$ was fixed at $\beta=3$. Comparing FIG. 17A with 17B, the frequency range at which the evaluation is high is shifted to lower in the frontal chest examples as compared with the bone examples. Thus, it was found that the frequency components that should be emphasized depends upon the type of disease or portion of the human body. The broken line (II) shows the results where $\beta$ was changed according to the original image signal continuously. In both examples, the range of high evaluation was expanded to both lower and higher frequency ranges. This is because, in FIG. 17A, saturated white areas (saturated to the fog level of the recording medium) at the heart and bone portion (including spine) disappeared and in FIG. 17B an increase in the noise level was prevented.

In the example of the chest, the emphasis coefficient $\beta$ was changed so that is was set at 0 at the brightness $S_0$ where the integrated histogram became 10% (equivalent to the maximum brightness at the spine) and set at 3 at the brightness $S_1$ where it was 50% (equivalent to the minimum brightness at the lung) and linearly changed therebetween.

The chain line (III) shows the results where the gradation process was added to the above process so that the contrast of the heart was lowered and the contrast of the lung was raised in FIG. 17A, and the contrast was raised as a whole to 1.5 times as high as the original contrast in FIG. 17B.

The thick solid line (IV) shows the results where the size of the image was reduced to $\frac{1}{2}$ to $\frac{1}{3}$ in addition to the above processes.

In a gradation process, the disease which shows a gentle change in contrast over a large area like a lung cancer or muscular tumor was made clearer. In the reduction of the image size, the super-low frequency components important for diagnosis were made closer to the optimum frequency of the modulation transfer function for the human visual sensitivity (1 to 2 cycle/mm), and the contrast appeared to have been enhanced and the diagnostic efficiency and accuracy were enhanced.

Further, when a smoothing process for making the modulation transfer function not less than 0.5 at the spatial frequency of 0.5 cycle/mm and not more than 0.5 at the spatial frequency of 5 cycle/mm was conducted in addition to the above-described emphasis of the super-low frequency components, the noise (granularity) in the image was removed and the diagnostic efficiency and accuracy was improved.

Figure 18:
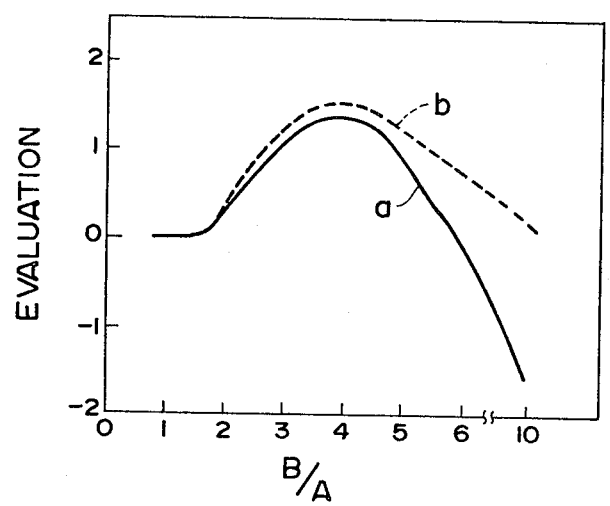
FIGS. 18 and 20 are graphs which show the relationship between the extent or degree of emphasis and the evaluation of the resulting images in diagnostic efficiency and accuracy.

FIG. 18 shows the relationship between the evaluation and the degree of emphasis represented by the ratio B/A for the chest. In this case, the frequency range to be emphasized was fixed at fc=0.1 and the emphasis coefficient $\beta$ was variously changed. The curve-a in FIG. 18 shows the results where $\beta$ was fixed regardless of the original image signal, and the curve-b shows the results where $\beta$ was changed continuously with the original image signal. The ratio B/A is the maximum ratio of B/A. For the curve-a where $\beta$ is constant, the evaluation falls below zero due to artifact-image formation when the ratio B/A was more than 6 or 7. For the curve-b where $\beta$ is changed, the artifact-image disappears and the evaluation is above zero over a wide range of $1.5 \leq B/A \leq 10$. As for the other examples, substantially the same results were observed.

Table 1 shows the range of fc where the evaluation was improved or above zero for other samples. The frequency fc is of the spatial frequency measured on the phosphor plate.

TABLE 1

| Portion of Sample | Frequency Range (fc:cycle/mm) |
| --- | --- |
| Frontal Chest | 0.01–0.2 |
| Lateral Chest | 0.01–0.05 |
| Bone (incl. muscle) | 0.05–0.5 |
| Mammary (calcification) | 0.1–0.5 |
| Mammary (Cancer) | 0.01–0.1 |
| Blood Vessel | 0.1–0.5 |
| Stomach | 0.1–0.5 |

As shown in the above table, the frequency range which is important for diagnosis was proved to be distributed in the very low frequency range around the range of $0.01 \leq fc \leq 0.5$ cycle/mm.

Further, it was confirmed that the diagnosis was further enhanced by the combination of the super-low frequency emphasis and other processes such as variation of the emphasis coefficient β, gradation processing, image size reduction and smoothing in all the above types of portions or diseases.

EXAMPLE II 200 samples for the portions as shown in Table 2 were examined both in a form of the conventional radiograph and in a form of the radiation image obtained using the present invention. Particularly, the diagnostic efficiency and accuracy were compared between those two types of images.

TABLE 2

Plain Image: Frontal Chest, Lateral Chest, Abdomen, Bone, Head, Mammary
Contrast Image: Stomach Double Contrast, Blood Vessel (Angiograph), Veins, Lymphograph
Tomographic Image: Chest, Abdomen In the process for obtaining the reproduction image, the emphasis coefficient β was fixed at 3 and a rectangular area was used as the unsharp mask for obtaining an simple arithmetic mean of the image signals of the picture elements therein. The evaluation was performed at six different spatial frequencies for which the modulation transfer function was 0.5 (fc). The results were evaluated by four radiologists, twelve clinical physicians, and four radiology technicians. These specialists evaluated the resulting images by subjective evaluation. The standard of evaluation was the same as in Example I.

Figure 19:
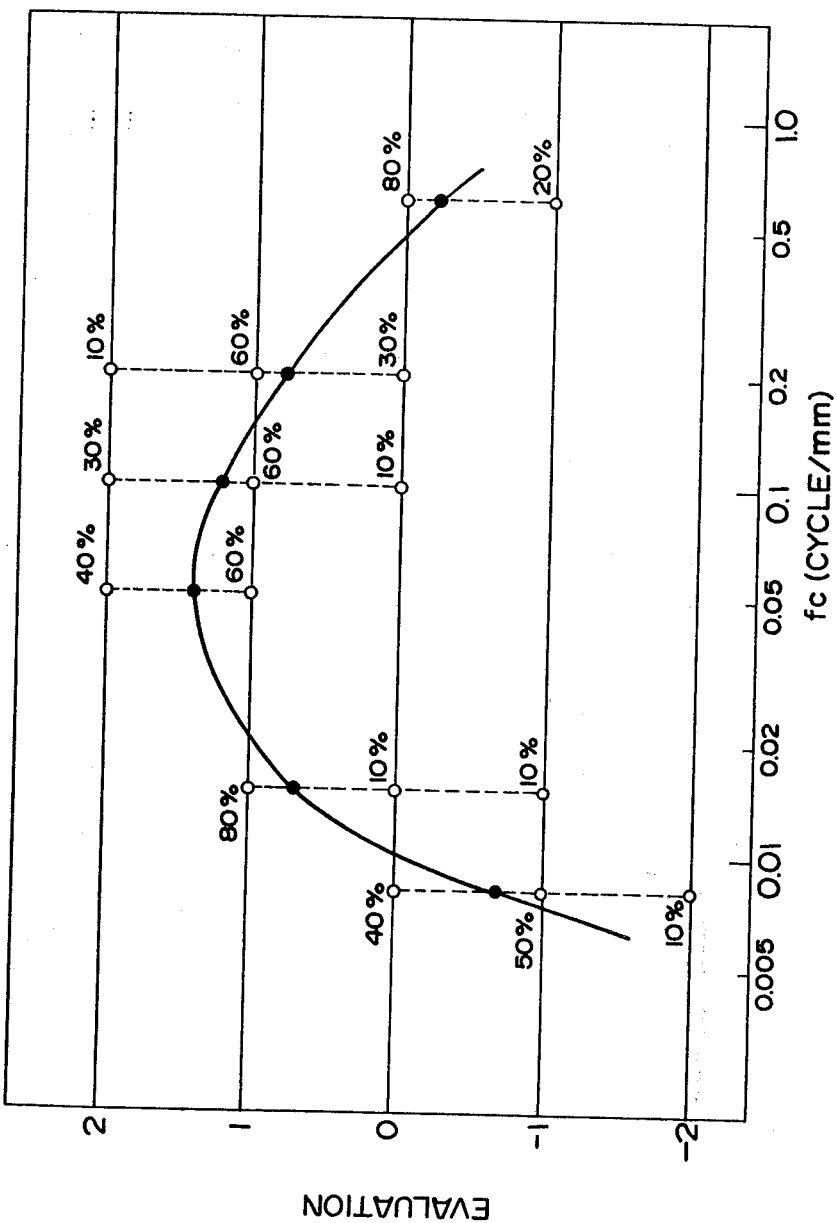

FIG. 19 shows the results of the evaluation by the 20 specialists for the 200 samples averaged into a simple curve in a graph of evaluation plotted against the spatial frequency fc at which the modulation transfer function was 0.5.

As shown in FIG. 19, the range of fc in which the diagnostic efficiency and accuracy was particularly enhanced was 0.02 to 0.15 cycle/mm. Further, by this examination, it was proved that the range of fc wherein the results of the process in accordance with this invention were recognized "improved" were not so different for different radiation images though the value of fc at which the evaluation was the highest, i.e. the peak of evaluation was somewhat different depending upon the evaluating person, the evaluated portion (part of the human body) or disease, and the purpose of the examination for the radiation image, i.e. mass survey or examination.

EXAMPLE III

Typical 20 samples of the portions as shown in Table 2 were evaluated with fc fixed at 0.05 cycle/mm and B/A variously changed. By the same method as of Example II, the radiation image in accordance with this invention was obtained and evaluated by 20 specialists as in Example II. The average values of the evaluation are shown in FIG. 20.

Figure 20:
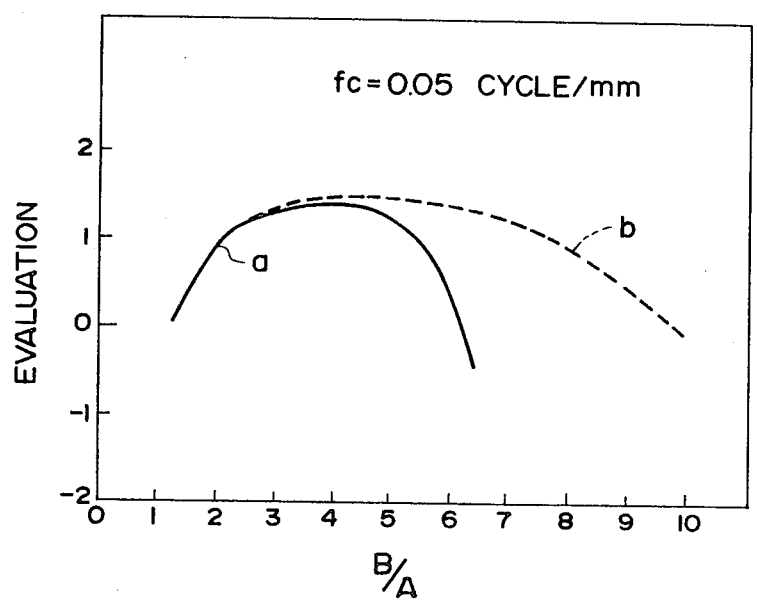

As shown in FIG. 20, when β was fixed (curve-a) the diagnostic efficiency and accuracy was enhanced in the range of 1.5 to 6 of B/A and particularly enhanced in the range of 2 to 5.5. When β was changed (curve-b), the diagnostic efficiency and accuracy was enhanced in the range of 1.5 to 10 and particularly enhanced in the range of 2 to 8.

EXAMPLE IV

Typical 100 samples of the portions as shown in Table 3 below were evaluated with β changed according to the original image signal or the unsharp mask signal as shown in FIGS. 3A to 3D. As the unsharp mask was used a simple arithmetic mean of image signals within a rectangular area. As the frequency fc the optimum frequency for every sample was selected within a range of 0.01 to 0.5 cycle/mm by trial and error. The evaluation of the resulting images was made by the same method as employed in Example I.

The results of the evaluation are shown in Table 3. In Table 3, A, B, C, D indicate the results of the evaluation of the image in the case where β was changed in the form of FIGS. 3A, 3B, 3C and 3D, respectively. When the evaluation where β was changed as shown in FIG. 3B was better than the evaluation where β was changed as shown in FIG. 3C, the indication of the evaluation result is shown as C<B, for example.

As shown in Table 3, it was proved that the evaluation was higher in the case where β was changed as shown in FIGS. 3B, 3C or 3D than the evaluation in the case where β was fixed as shown in FIG. 3A.

TABLE 3

| Sample | Rank of Evaluation | | Evaluation (DE: diagnostic efficiency and accuracy) |
|---|---|---|---|
| Head | A<C<B | B: | DE of brain tumor and muscle of face was improved. |
| Plain Roentgenogram | A<B<C | C: | DE of cancer overlapped with spine or heart was improved. |
| Chest | A<C<B | B: | DE of cancer in the lung field portion and pneumonia was improved. |
| Chest Tomography | A<B<C | C: | DE of cancer at mediastinum and brinchitis was improved. |
|  | A<C<B | B: | DE of cancer in the lung field portion was improved. |
| Bone, Muscle | A<B<C | C: | DE of fracture and epiphyseal line was improved. |
|  | A<C<B | B: | DE of muscle tumor was improved. |
| Mammary | A<B<C | C: | DE of cancer and calcification of mammary glandular tissue was improved. |
|  | A<C<B | B: | DE of abnormality of fat and skin was improved. |
| Blood Vessel (Angiograph) | A<B<C | C: | Fine details of blood vessels were clearly observed. |
| Lymphograph | A<B<C | C: | Lymphatic gland and node were clearly observed and well reflected anatomical structure. |
| Stomach Double Contrast | A<B<D | D: | DE of stomach details was improved. |
| Cholecystograph | A<B<D | D: | DE of common bile duct and gallstone was improved. |
| Liver | A<B<D | D: | The internal structure of liver was clearly observed. |

EXAMPLE V

Four samples for each of the chest and bone were evaluated for comparing an ideal unsharp mask with the unsharp mask having a rectangular shape.

Sampling of the image in the stimulable phosphor was conducted at the rate of 10 pixel/mm and a circular mask having a diameter of 6 mm was used to calculate the ideal unsharp mask signal by weighting the original image signal with a weighting coefficient having a Gaussian distribution over the mask. Another unsharp mask was obtained by scanning the phosphor in the primary direction at a speed of $20 \times 10^3$ pixel/sec and having the output of the image signal pass through a low-pass filter having a cut-off frequency of $0.2 \times 10$ cycle/sec. The low-pass filtered signals were simply added together for the sub-scanning direction by a digital calculation (i.e. simple arithmetic mean). The emphasis coefficient $\beta$ was set at 2.

The evaluation of the results was made by the same method as employed in Example I by four radiologists. The results showed that there was no difference between the above two kinds of unsharp mask in their diagnostic efficiency and accuracy.

EXAMPLE VI

The emphasis coefficient $\beta$ was changed to 4 and all the other conditions were the same as in Example V. The results obtained were substantially the same as those of Example V.

We claim:

1. A method of recording an enhanced radiation image in a radiation image recording system comprising the steps of: scanning a stimulable phosphor with a stimulating beam; reading out and converting radiation image information recorded in said stimulable phosphor into an original image electric signal upon stimulation thereof; processing said original signal to produce an output signal in accordance with $$S' = Sorg + \beta(Sorg - Sus)$$

where Sorg is said original image signal, $\beta$ is an emphasis coefficient, Sus is an unsharp mask signal corresponding to a predetermined super-low spatial frequency at every scanning point, and S' is said output signal whereby a frequency component above said predetermined super-low spatial frequency is emphasized; and displaying a visual image in response to said output signal.

2. A method of recording an enhanced radiation image in a radiation image recording system as defined in claim 1 wherein said unsharp mask signal corresponds to a modulation transfer function which is not less than 0.5 at a spatial frequency of 0.01 cycle/mm and not more than 0.5 at a spatial frequency of 0.5 cycle/mm.

3. A method of recording an enhanced radiation image in a radiation image recording system as defined in claim 1 wherein said unsharp mask signal corresponds to a modulation transfer function which is not less than 0.5 at a spatial frequency of 0.02 cycle/mm and not more than 0.5 at a spatial frequency of 0.15 cycle/mm.

4. A method of recording an enhanced radiation image as defined in any one of claims 1 to 3 wherein said emphasis coefficient $\beta$ is varied in response to one of said original image signal and said unsharp mask signal.

5. A method of recording an enhanced radiation image as defined in any one of claims 1 to 3 wherein the maximum value of a modulation transfer function of a finally recorded radiation image is 1.5 to 10 times as large as a limit value of said modulation transfer function where said spatial frequency is infinitely close to zero and wherein said emphasis coefficient $\beta$ is varied in response to one of said original image signal and said unsharp mask signal.

6. A method of recording an enhanced radiation image as defined in claim 1 wherein said emphasis coefficient $\beta$ is a constant value.

7. A method of recording an enhanced radiation image as defined in claim 6 wherein the maximum value of a modulation transfer function of a finally recorded radiation image is 1.5 to 6 times as large as a limit value of said modulation transfer function where said spatial frequency is infinitely close to zero.

8. A method of recording an enhanced radiation image as defined in claim 1 further comprising a step of smoothing said output signal, wherein a modulation transfer function of a finally recorded radiation image is not less than 0.5 at a spatial frequency of 0.5 cycle/mm and not more than 0.5 at a spatial frequency of 5 cycle/mm.

9. A method of recording an enhanced radiation image as defined in claim 8 wherein said unsharp mask signal Sus is obtained by low-pass filtering said original image signal Sorg in analog form in a primary scanning direction on said stimulable phophor and calculating an arithmetic mean of low-pass filtered signals in a sub-scanning direction on said stimulable phophor.

10. A method of recording an enhanced radiation image as defined in claim 9 wherein said arithmetic means is a simple arithmetic mean.

11. A method of recording an enhanced radiation image as defined in claim 1 wherein said unsharp mask signal Sus is obtained by calculating a simple arithmetic mean of original image signals Sorg of a plurality of scanning points within a rectangular area enclosed by two parallel lines in a direction of primary scanning of said stimulating beam on said stimulable phosphor and two parallel lines in a direction of sub-scanning of said stimulating beam on said stimulable phophor.

12. A method of recording an enhanced radiation image as defined in claim 1 wherein a finally recorded image is reduced in size as compared with a corresponding image on said stimulable phosphor.

13. An apparatus for recording an enhanced radiation image in a radiation image recording system comprising a stimulating beam source for emitting a stimulating beam; means for scanning said beam upon a stimulable phophor for stimulating said phosphor to emit light according to a radiation image recorded therein; a photodetector for detecting emitted light from said stimulable phosphor and converting said light to an original image electric signal, and an operation unit means for processing said original image electric signal, said operation unit means processing said original image electrical signal in accordance with $$S' = Sorg + \beta(Sorg - Sus)$$

to produce an output signal where Sorg is said original image electrical signal, $\beta$ is an emphasis coefficient, Sus is an unsharp mask signal corresponding to a super-low spatial frequency at every detecting point and S' is said output signal; and means for recording a visual image on a recording material in response to said output signal.

14. An apparatus for recording an enhanced radiation image as defined in claim 13 wherein said operation unit means comprises a low-pass filter for low-pass filtering in a primary scanning direction on said stimulable phosphor said original image electrical signal, an A/D converter for A/D converting an output of said low-pass filter, and a digital calculating means for calculating an arithmetic mean of an output of said A/D converter in a sub-scanning direction of said beam on said stimulable phosphor, thereby obtaining said unsharp mask signal Sus corresponding to said super-low frequency at every detecting point.

15. An apparatus for recording an enhanced radiation image as defined in claim 13 wherein said operation unit means comprises circuit means for calculating a simple arithmetic mean of said original image electrical signal within a rectangular area enclosed by two parallel lines in a primary scanning direction of said beam on said stimulable phophor and two parallel lines in a sub-scanning direction of said beam on said stimulable phosphor to obtain said unsharp mask signal Sus.

16. An apparatus for processing a radiation image as defined in any one of claims 13 to 15 wherein said operation unit means comprises means for determining said emphasis coefficient $\beta$ in response to one of said original image signal Sorg and unsharp mask signal Sus.

* * * * *